(12) United States Patent
Kanou et al.

(10) Patent No.: US 9,171,215 B2
(45) Date of Patent: Oct. 27, 2015

(54) IMAGE PROCESSING DEVICE

(71) Applicant: HONDA MOTOR CO., LTD., Minato-ku, Tokyo (JP)

(72) Inventors: Tadahiko Kanou, Saitama (JP); Masahiko Adachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/371,530

(22) PCT Filed: Nov. 29, 2012

(86) PCT No.: PCT/JP2012/080894
§ 371 (c)(1),
(2) Date: Jul. 10, 2014

(87) PCT Pub. No.: WO2013/108493
PCT Pub. Date: Jul. 25, 2013

(65) Prior Publication Data
US 2014/0375815 A1 Dec. 25, 2014

(30) Foreign Application Priority Data
Jan. 17, 2012 (JP) ................................. 2012-006947

(51) Int. Cl.
*G06K 9/00* (2006.01)
*H04N 9/04* (2006.01)
(Continued)

(52) U.S. Cl.
CPC .............. *G06K 9/00798* (2013.01); *B60R 1/00* (2013.01); *H04N 5/2351* (2013.01); *H04N 5/2355* (2013.01); *H04N 9/045* (2013.01); *B60R 2300/804* (2013.01)

(58) Field of Classification Search
CPC ... H04N 5/2351; H04N 5/2355; H04N 9/045; B60R 1/00; B60R 2300/804; G06K 9/00798
See application file for complete search history.

(56) References Cited

U.S. PATENT DOCUMENTS

| 6,784,939 B1 | 8/2004 | Lee et al. |
| 2008/0187235 A1 | 8/2008 | Wakazono et al. |
| 2009/0316018 A1 | 12/2009 | Umeda |

(Continued)

FOREIGN PATENT DOCUMENTS

| JP | 2007-180811 A | 7/2007 |
| JP | 2008-507908 A | 3/2008 |

(Continued)

OTHER PUBLICATIONS extended European Search Report dated Jun. 30, 2015 issued in the counterpart EP Patent Application 12866134.5.

*Primary Examiner* — Andy Rao
*Assistant Examiner* — Tyler Edwards
(74) *Attorney, Agent, or Firm* — Carrier Blackman & Associates, P.C.; Joseph P. Carrier; William D. Blackman

(57) ABSTRACT

An exposure level determination unit (33) determines, for a region of interest in an original image captured by a camera (2) using a first exposure level in a control cycle at a predetermined time point, a second exposure level which is an exposure level for the next control cycle, by calculating a transparent pixel saturation rate which is a ratio of transparent pixels having a saturated gradation value among transparent pixels in the region of interest, and changing the first exposure level according to the transparent pixel saturation rate.

8 Claims, 9 Drawing Sheets

(51) Int. Cl.
   *B60R 1/00* (2006.01)
   *H04N 5/235* (2006.01)

(56) References Cited

U.S. PATENT DOCUMENTS

| | | |
|---|---|---|
| 2011/0063481 A1 | 3/2011 | Natori |
| 2011/0085062 A1 | 4/2011 | Rhodes |
| 2012/0050074 A1* | 3/2012 | Bechtel et al. ............... 340/988 |

FOREIGN PATENT DOCUMENTS

| | | |
|---|---|---|
| JP | 2008-104010 A | 5/2008 |
| JP | 2010-199849 A | 9/2010 |
| JP | 2011-066637 A | 3/2011 |
| JP | 2011-114576 A | 6/2011 |
| JP | 2012-084814 A | 4/2012 |
| WO | 2006/014641 A2 | 2/2006 |

* cited by examiner

FIG.2A

| | j=1 | 2 | 3 | 4 | 5 | 6 | ... | n |
|---|---|---|---|---|---|---|---|---|
| i=1 | $R_{11}$ | $G_{12}$ | $B_{13}$ | $G_{14}$ | $R_{15}$ | $G_{16}$ | ... | $F_{1n}$ |
| 2 | $G_{21}$ | $W_{22}$ | $G_{23}$ | $W_{24}$ | $G_{25}$ | $W_{26}$ | ... | $F_{2n}$ |
| 3 | $B_{31}$ | $G_{32}$ | $R_{33}$ | $G_{34}$ | $B_{35}$ | $G_{36}$ | ... | $F_{3n}$ |
| 4 | $G_{41}$ | $W_{42}$ | $G_{43}$ | $W_{44}$ | $G_{45}$ | $W_{46}$ | ... | $F_{4n}$ |
| 5 | $R_{51}$ | $G_{52}$ | $B_{53}$ | $G_{54}$ | $R_{55}$ | $G_{56}$ | ... | $F_{5n}$ |
| 6 | $G_{61}$ | $W_{62}$ | $G_{63}$ | $W_{64}$ | $G_{65}$ | $W_{66}$ | ... | $F_{6n}$ |
| ⋮ | ⋮ | ⋮ | ⋮ | ⋮ | ⋮ | ⋮ | ⋱ | ⋮ |
| m | $F_{m1}$ | $F_{m2}$ | $F_{m3}$ | $F_{m4}$ | $F_{m5}$ | $F_{m6}$ | ... | $F_{mn}$ |

F IS ONE OF R, G, B, AND W.

FIG.2B

| | j=1 | 2 | 3 | 4 | 5 | 6 | ... | n |
|---|---|---|---|---|---|---|---|---|
| i=1 | $Sr_{11}$ | $Sg_{12}$ | $Sb_{13}$ | $Sg_{14}$ | $Sr_{15}$ | $Sg_{16}$ | ... | $Sf_{1n}$ |
| 2 | $Sg_{21}$ | $Sw_{22}$ | $Sg_{23}$ | $Sw_{24}$ | $Sg_{25}$ | $Sw_{26}$ | ... | $Sf_{2n}$ |
| 3 | $Sb_{31}$ | $Sg_{32}$ | $Sr_{33}$ | $Sg_{34}$ | $Sb_{35}$ | $Sg_{36}$ | ... | $Sf_{3n}$ |
| 4 | $Sg_{41}$ | $Sw_{42}$ | $Sg_{43}$ | $Sw_{44}$ | $Sg_{45}$ | $Sw_{46}$ | ... | $Sf_{4n}$ |
| 5 | $Sr_{51}$ | $Sg_{52}$ | $Sb_{53}$ | $Sg_{54}$ | $Sr_{55}$ | $Sg_{56}$ | ... | $Sf_{5n}$ |
| 6 | $Sg_{61}$ | $Sw_{62}$ | $Sg_{63}$ | $Sw_{64}$ | $Sg_{65}$ | $Sw_{66}$ | ... | $Sf_{6n}$ |
| ⋮ | ⋮ | ⋮ | ⋮ | ⋮ | ⋮ | ⋮ | ⋱ | ⋮ |
| m | $Sf_{m1}$ | $Sf_{m2}$ | $Sf_{m3}$ | $Sf_{m4}$ | $Sf_{m5}$ | $Sf_{m6}$ | ... | $Sf_{mn}$ | f IS ONE OF r, g, b, AND w.

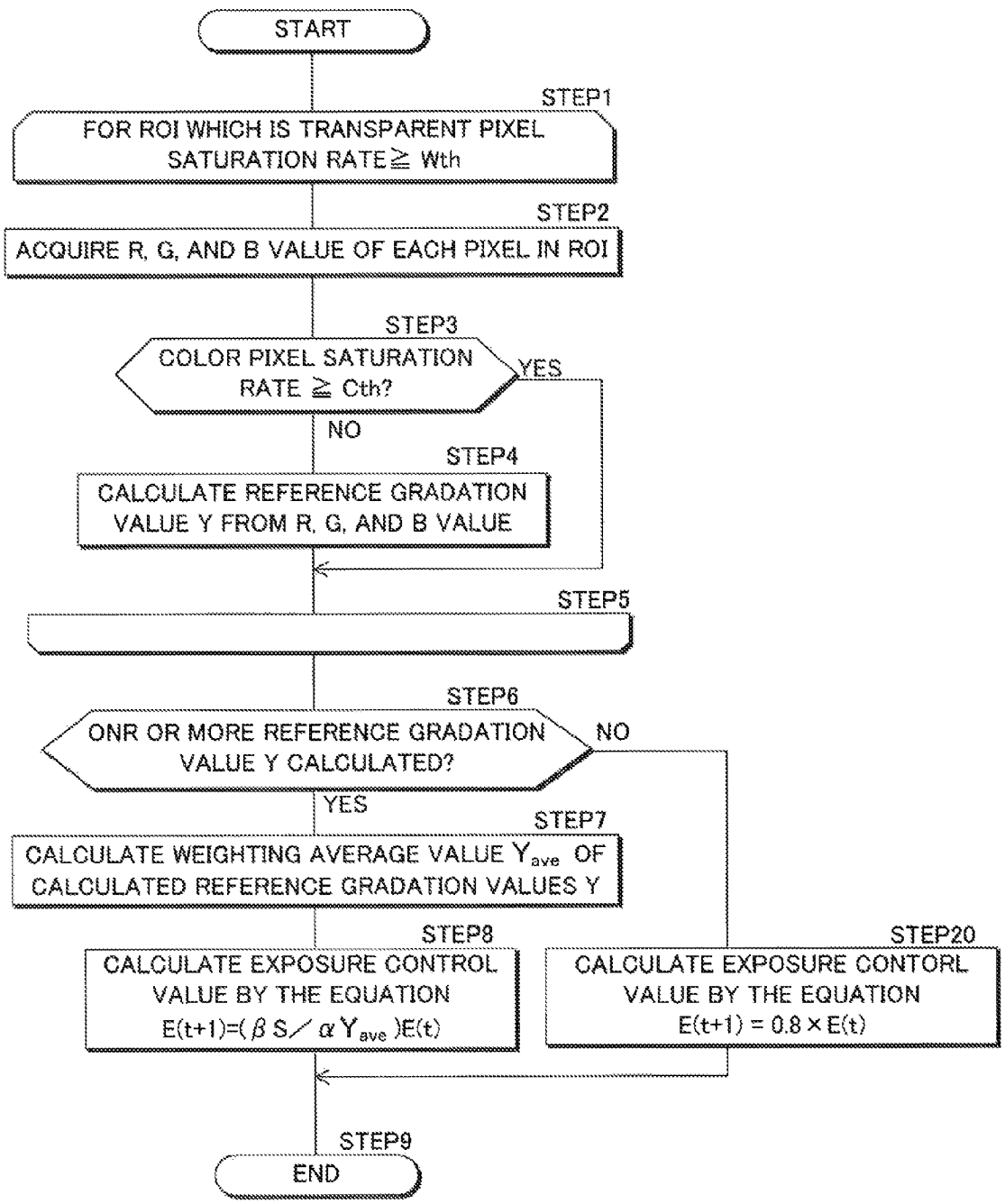

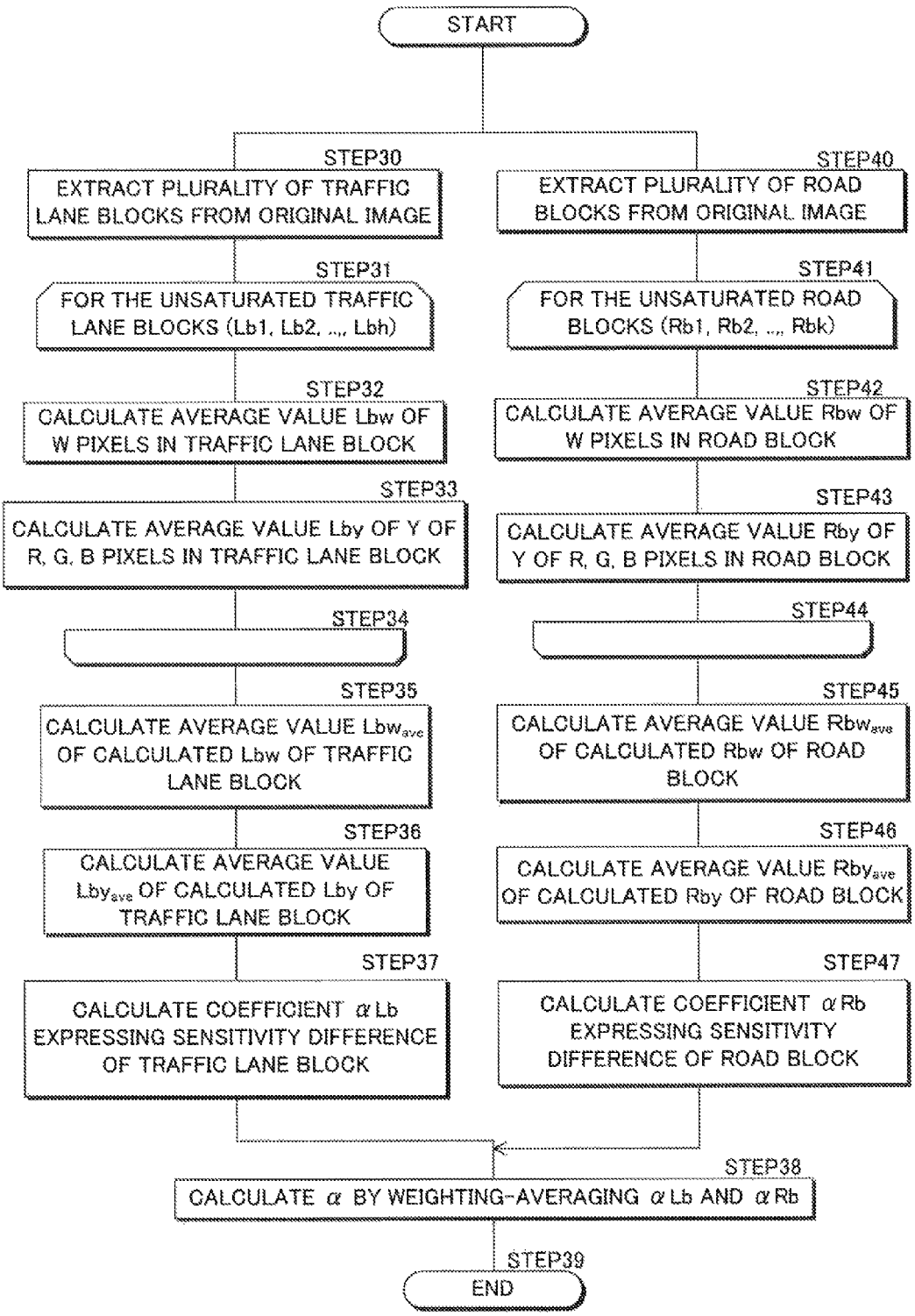

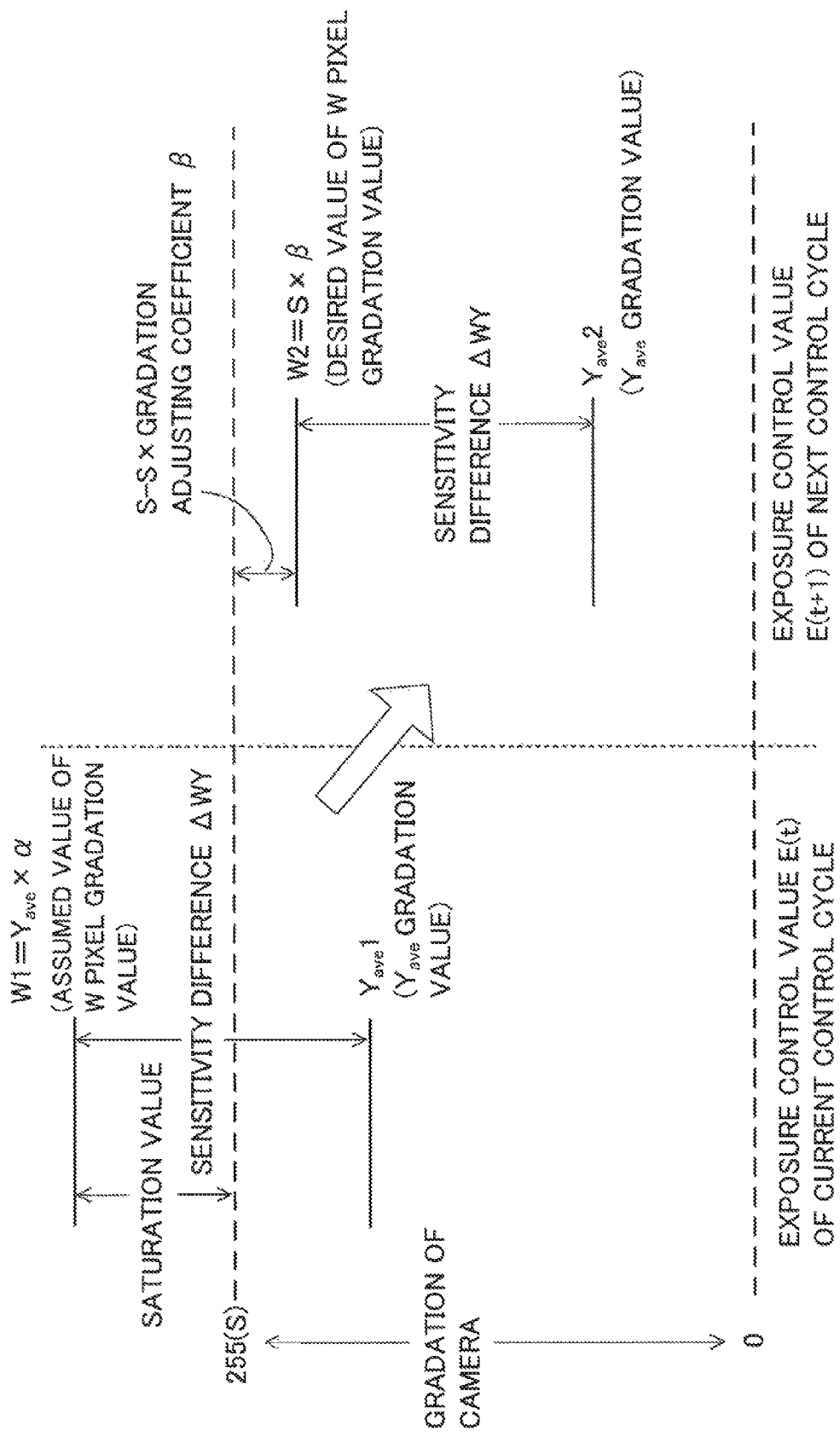

FIG.8A

| | j=1 | 2 | 3 | 4 | 5 | 6 | ............... | n | |
|---|---|---|---|---|---|---|---|---|---|
| i=1 | $H_{11}$ | $H_{12}$ | $H_{13}$ | $H_{14}$ | $H_{15}$ | $H_{16}$ | ............... | $H_{1n}$ | |
| 2 | $H_{21}$ | $H_{22}$ | $H_{23}$ | $H_{24}$ | $H_{25}$ | $H_{26}$ | ............... | $H_{2n}$ | |
| 3 | $H_{31}$ | $H_{32}$ | $H_{33}$ | $H_{34}$ | $H_{35}$ | $H_{36}$ | ............... | $H_{3n}$ | |
| 4 | $H_{41}$ | $H_{42}$ | $H_{43}$ | $H_{44}$ | $H_{45}$ | $H_{46}$ | ............... | $H_{4n}$ | |
| 5 | $H_{51}$ | $H_{52}$ | $H_{53}$ | $H_{54}$ | $H_{55}$ | $H_{56}$ | ............... | $H_{5n}$ | 43 |
| 6 | $H_{61}$ | $H_{62}$ | $H_{63}$ | $H_{64}$ | $H_{65}$ | $H_{66}$ | ............... | $H_{6n}$ | |
| ⋮ | ⋮ | ⋮ | ⋮ | ⋮ | | | | ⋮ | |
| m | $H_{m1}$ | $H_{m2}$ | $H_{m3}$ | $H_{m4}$ | $H_{m5}$ | $H_{m6}$ | ............... | $H_{mn}$ | |

FIG.8B

| | j=1 | 2 | 3 | 4 | 5 | 6 | ............... | n | |
|---|---|---|---|---|---|---|---|---|---|
| i=1 | $D_{11}$ | $D_{12}$ | $D_{13}$ | $D_{14}$ | $D_{15}$ | $D_{16}$ | ............... | $D_{1n}$ | |
| 2 | $D_{21}$ | $D_{22}$ | $D_{23}$ | $D_{24}$ | $D_{25}$ | $D_{26}$ | ............... | $D_{2n}$ | |
| 3 | $D_{31}$ | $D_{32}$ | $D_{33}$ | $D_{34}$ | $D_{35}$ | $D_{36}$ | ............... | $D_{3n}$ | |
| 4 | $D_{41}$ | $D_{42}$ | $D_{43}$ | $D_{44}$ | $D_{45}$ | $D_{46}$ | ............... | $D_{4n}$ | 44 |
| 5 | $D_{51}$ | $D_{52}$ | $D_{53}$ | $D_{54}$ | $D_{55}$ | $D_{56}$ | ............... | $D_{5n}$ | |
| 6 | $D_{61}$ | $D_{62}$ | $D_{63}$ | $D_{64}$ | $D_{65}$ | $D_{66}$ | ............... | $D_{6n}$ | |
| ⋮ | ⋮ | ⋮ | ⋮ | ⋮ | | | | ⋮ | |
| m | $D_{m1}$ | $D_{m2}$ | $D_{m3}$ | $D_{m4}$ | $D_{m5}$ | $D_{m6}$ | ............... | $D_{mn}$ | |

FIG.9A

| | j=1 | 2 | 3 | 4 | 5 | 6 | ... | n |
|---|---|---|---|---|---|---|---|---|
| i=1 | $R_{11}$ | $W_{12}$ | $B_{13}$ | $W_{14}$ | $R_{15}$ | $W_{16}$ | ... | $F_{1n}$ |
| 2 | $W_{21}$ | $G_{22}$ | $W_{23}$ | $G_{24}$ | $W_{25}$ | $G_{26}$ | ... | $F_{2n}$ |
| 3 | $B_{31}$ | $W_{32}$ | $R_{33}$ | $W_{34}$ | $B_{35}$ | $W_{36}$ | ... | $F_{3n}$ |
| 4 | $W_{41}$ | $G_{42}$ | $W_{43}$ | $G_{44}$ | $W_{45}$ | $G_{46}$ | ... | $F_{4n}$ |
| 5 | $R_{51}$ | $W_{52}$ | $B_{53}$ | $W_{54}$ | $R_{55}$ | $W_{56}$ | ... | $F_{5n}$ |
| 6 | $W_{61}$ | $G_{62}$ | $W_{63}$ | $G_{64}$ | $W_{65}$ | $G_{66}$ | ... | $F_{6n}$ |
| ⋮ | ⋮ | ⋮ | ⋮ | ⋮ | ⋮ | | ⋱ | ⋮ |
| m | $F_{m1}$ | $F_{m2}$ | $F_{m3}$ | $F_{m4}$ | $F_{m5}$ | $F_{m6}$ | ... | $F_{mn}$ |

F IS ONE OF R, G, B, AND W.

FIG.9B

| | j=1 | 2 | 3 | 4 | 5 | 6 | ... | n |
|---|---|---|---|---|---|---|---|---|
| i=1 | $Sr_{11}$ | $Sw_{12}$ | $Sb_{13}$ | $Sw_{14}$ | $Sr_{15}$ | $Sw_{16}$ | ... | $Sf_{1n}$ |
| 2 | $Sw_{21}$ | $Sg_{22}$ | $Sw_{23}$ | $Sg_{24}$ | $Sw_{25}$ | $Sg_{26}$ | ... | $Sf_{2n}$ |
| 3 | $Sb_{31}$ | $Sw_{32}$ | $Sr_{33}$ | $Sw_{34}$ | $Sb_{35}$ | $Sw_{36}$ | ... | $Sf_{3n}$ |
| 4 | $Sw_{41}$ | $Sg_{42}$ | $Sw_{43}$ | $Sg_{44}$ | $Sw_{45}$ | $Sg_{46}$ | ... | $Sf_{4n}$ |
| 5 | $Sr_{51}$ | $Sw_{52}$ | $Sb_{53}$ | $Sw_{54}$ | $Sr_{55}$ | $Sw_{56}$ | ... | $Sf_{5n}$ |
| 6 | $Sw_{61}$ | $Sg_{62}$ | $Sw_{63}$ | $Sg_{64}$ | $Sw_{65}$ | $Sg_{66}$ | ... | $Sf_{6n}$ |
| ⋮ | ⋮ | ⋮ | ⋮ | ⋮ | ⋮ | | ⋱ | ⋮ |
| m | $Sf_{m1}$ | $Sf_{m2}$ | $Sf_{m3}$ | $Sf_{m4}$ | $Sf_{m5}$ | $Sf_{m6}$ | ... | $Sf_{mn}$ | f IS ONE OF r, g, b, AND w.

IMAGE PROCESSING DEVICE

TECHNICAL FIELD

The present invention relates to an image processing device which processes imaging data acquired by an imaging element including an arrangement of pixels for receiving light through a color filter and pixels for receiving light without using a color filter.

BACKGROUND ART

Conventionally, there has been proposed a method of improving the sensitivity of a color image by using an imaging element including an arrangement of pixels for receiving light through a color filter (color light-receiving pixels) and pixels for receiving light without using a color filter (transparent light-receiving pixels) (refer to, for example, Patent Document 1).

PRIOR ART DOCUMENT

Patent Document

Patent Document 1: Published Japanese translation of PCT International Publication for Patent Application No. 2008-507908

SUMMARY OF THE INVENTION

Problems to be Solved by the Invention

Comparing pixels for receiving light through a color filter (color light-receiving pixels) and pixels for receiving light without using a color filter (transparent light-receiving pixels), the transparent light-receiving pixels have higher sensitivity than the color light-receiving pixels. Therefore, when imaging an object with high luminance, the transparent light-receiving pixels saturate first (exceeds a saturated charge amount of photodiode).

Once the transparent light-receiving pixels saturate, it is difficult to set an exposure level of the camera to an appropriate level of a degree which does not generate saturation of the transparent light-receiving pixels. In this regard, Patent Document 1 proposes a method to prevent the saturation of the transparent light-receiving pixels by setting a charge storage time by the received light of the transparent light-receiving pixels to a shorter time than that of the color light-receiving pixels.

However, this method has an inconvenience that a pixel circuit and the readout circuit of the imaging element become complicated, and also has an inconvenience that the image quality of the captured image becomes considerably deteriorated due to the fact that the charge storage time differs between the transparent light-receiving pixels and the color light-receiving pixels.

The present invention has been made in view of the above background. Therefore, it is an object of the present invention to provide an image processing device capable of appropriately setting an exposure level of a camera using an imaging element including an arrangement of pixels for receiving light through a color filter and pixels for receiving light without using the color filter, while restraining complexity of circuit configuration and deterioration of image quality of the captured image.

Means for Solving the Problems

The present invention has been made in order to achieve the above object, and an image processing device of the present invention comprises:

a camera configured to capture an image using an imaging element including an arrangement of a plurality of color light-receiving pixels which receive light through a color filter and a plurality of transparent light-receiving pixels which receive light without using the color filter;

a camera control unit configured to capture an image by the camera at a predetermined exposure level for each predetermined control cycle;

a region of interest setting unit configured to set at least one predetermined region of interest with respect to an original image captured by the camera and including an arrangement of a plurality of color pixels which are individually assigned with a gradation value according to a light-receiving level of each of the color light-receiving pixels and a plurality of transparent pixels which are individually assigned with a gradation value according to a light-receiving level of each of the transparent light-receiving pixels; and an exposure level determination unit configured, for the region of interest of the original image captured by the camera using a first exposure level in a control cycle of a predetermined time point, to calculate a transparent pixel saturation rate which is a ratio of transparent pixels whose gradation value is saturated among the transparent pixels in the region of interest, and to determine a second exposure level which is an exposure level of a next control cycle, by changing the first exposure level according to the transparent pixel saturation rate (first aspect of the invention).

According to the first aspect of the invention, as the transparent pixel saturation rate calculated by the exposure level determination unit is higher, the degree of excess of the exposure level of the camera becomes larger. Therefore, by determining the second exposure level by changing the first exposure level according to the transparent pixel saturation rate calculated from the original image captured with the first exposure level, it is able to make the exposure level of the camera appropriate at the next control cycle. In such case, since it is not necessary to set the charge storage time by the light received by the transparent light-receiving pixels and by the color light-receiving pixels to be different, the pixel circuit and the readout circuit of the imaging element do not become complicated and the image quality of the captured image does not deteriorate due to the difference of the charge storage time.

According to the first aspect of the invention, it is preferable that the exposure level determination unit is configured, with respect to the region of interest, to calculate a color pixel saturation rate which is a ratio of color pixels whose gradation value is saturated among the color pixels, and when the color pixel saturation rate is less than a predetermined color pixel saturation threshold value, to calculate a gray first reference gradation value based on the gradation value of each of the color pixels in the region of interest, and to determine the second exposure level based on the first reference gradation value (second aspect of the invention).

According to the second aspect of the invention, when the color pixel saturation rate is less than the color pixel saturation threshold value, it is able to recognize the degree of allowance until the color light-receiving pixels saturate at the first exposure level, from the first reference gradation value based on the gradation value of the color pixels. Moreover, since the difference of sensitivity of the transparent light-receiving pixels and the color light-receiving pixels falls within a range of a certain degree, it is able to estimate the degree of overexposure of the transparent light-receiving pixels at the first exposure level from the first reference gradation value. In this regard, it is able to appropriately determine the second exposure level based on the first reference gradation value.

According to the second aspect of the invention, it is preferable that the color filter is a three primary color filter, and the color light-receiving pixels receive light through a filter of either color among three primary colors, the exposure level determination unit is configured, for each transparent pixel in the region of interest, to assign each gradation value of the three primary color based on the gradation value of the color pixels arranged in periphery, and also for each of the color pixels in the region of interest, to assign each gradation value of the three primary color based on the gradation value of each of the color pixels or the gradation value of other color pixels arranged in periphery, to calculate a gray second reference gradation value of each pixel from each gradation value of the three primary color assigned to the each pixel of the original image, and to calculate the first reference gradation value by averaging the second reference gradation value of the each pixel (third aspect of the invention).

According to the third aspect of the invention, it is able to calculate the first reference gradation value by assigning each gradation value of the three primary color to each pixel with respect to the original image captured by the imaging element provided with a general three primary color filter as the color filter.

According to the third aspect of the invention, it is preferable that the exposure level determination unit is configured to extract an unsaturated region from the region of interest, the unsaturated region being a region in which the transparent pixel saturation rate is less than a first transparent pixel saturation threshold value and also the color pixel saturation rate is less than a second color pixel saturation threshold value, and to calculate a luminance difference degree between an average value of the gradation value of the transparent pixels in the unsaturated region and an average value of the second reference gradation value of the color pixels in the unsaturated region, and to determine the second exposure level by using a corrected gradation value in which the first reference gradation value is corrected based on the luminance difference degree.
(fourth aspect of the invention).

According to the fourth aspect of the invention, the luminance difference degree between the average value of the gradation value of the transparent pixels in the unsaturated region and the average value of the second reference gradation value of the color pixels in the unsaturated region reflects the difference in sensitivity between the transparent light-receiving pixels and the color light-receiving pixels. In this regard, the exposure level determination unit is able to calculate the corrected gradation value which corresponds to the gradation value of the saturated transparent pixel by correcting the first reference gradation value by using the luminance difference degree. Moreover, by using the corrected gradation value, it is able to determine the second exposure level according to the degree of saturation of the transparent pixels.

According to the fourth aspect of the invention, it is preferable that the second exposure level is determined based on a difference between a maximum permissible gradation value of each transparent pixel and the corrected gradation value, so as to reduce the difference (fifth aspect of the invention).

According to the fifth aspect of the invention, the corrected gradation value corresponds to the gradation value of the saturated transparent pixel, the difference degree of the maximum permissible gradation value of the transparent pixels and the corrected gradation value becomes a degree indicating an excess degree from the maximum permissible gradation value of the transparent pixels. Therefore, by determining the second exposure level so as to reduce this difference, it is able to make the second exposure level to be the appropriate one.

According to the fourth or the fifth aspect of the invention, it is preferable that the camera is mounted on the vehicle and images a periphery of the vehicle, and the exposure level determination unit is configured to extract the unsaturated region from an image portion of a road included in the original image (sixth aspect of the invention).

According to the sixth aspect of the invention, since the road is generally an achromatic color (gray or the like), each gradation value of the three primary color assigned to the color pixels of the image portion of the road included in the region of interest becomes a gradation value according to the achromatic color. Therefore, by extracting the unsaturated region from the image portion of the road, it is able to accurately calculate the luminance difference degree. The position of the image portion of the road in the region of interest may be a fixed location which is previously assumed and determined as a portion the road occupies in the original image or may be a range detected from the original image.

According to the sixth aspect of the invention, it is preferable to comprise a lane mark detection unit configured to detect an image portion of a lane mark laid on the road from the original image, and wherein the exposure level determination unit is configured to recognize the image portion of the road included in the original image based on a position of the image portion of the lane mark detected by the lane mark detection unit (seventh aspect of the invention).

According to the seventh aspect of the invention, the region of interest setting unit is able to accurately recognize the image portion of the road in the original image from the image portion of the lane mark in the original image detected from the lane mark detection unit, and to set the unsaturated region in the image portion of the road.

The lane mark detection unit is configured to detect an image portion of a white line as the image portion of the lane mark, and the exposure level determination unit is configured to extract a first of the unsaturated region from the image portion of the road in the region of interest and also extract a second of the unsaturated region from the image portion of the white line in the region of interest, and to calculate the luminance difference degree used for a calculation of the corrected gradation value by weighting and averaging a first of the luminance difference degree calculated for the first of the unsaturated region and a second of the luminance difference degree calculated for the second of the unsaturated region (eighth aspect of the invention).

According to the eight aspect of the invention, it is able to calculate the luminance difference degree by weighting either of the achromatic color road and the white line which is more important.

BRIEF DESCRIPTION OF THE DRAWINGS

FIG. 2A and FIG. 2B are explanatory diagrams of captured images taken by a filter of an imaging element and a camera.

FIG. 5 is a flowchart of arithmetic processing of an exposure control value.

FIG. 6 is a flowchart of arithmetic processing of a sensitivity difference coefficient.

FIG. 7 is an explanatory diagram of the arithmetic processing of the exposure control value.

FIG. 8A is an explanatory diagram of a high-sensitivity image and FIG. 8B is an explanatory diagram of a wide dynamic range image.

FIG. 9A and FIG. 9B are explanatory diagrams of captured images taken by a filter of an imaging element and a camera in another embodiment.

MODE FOR CARRYING OUT THE INVENTION

Figure 1:
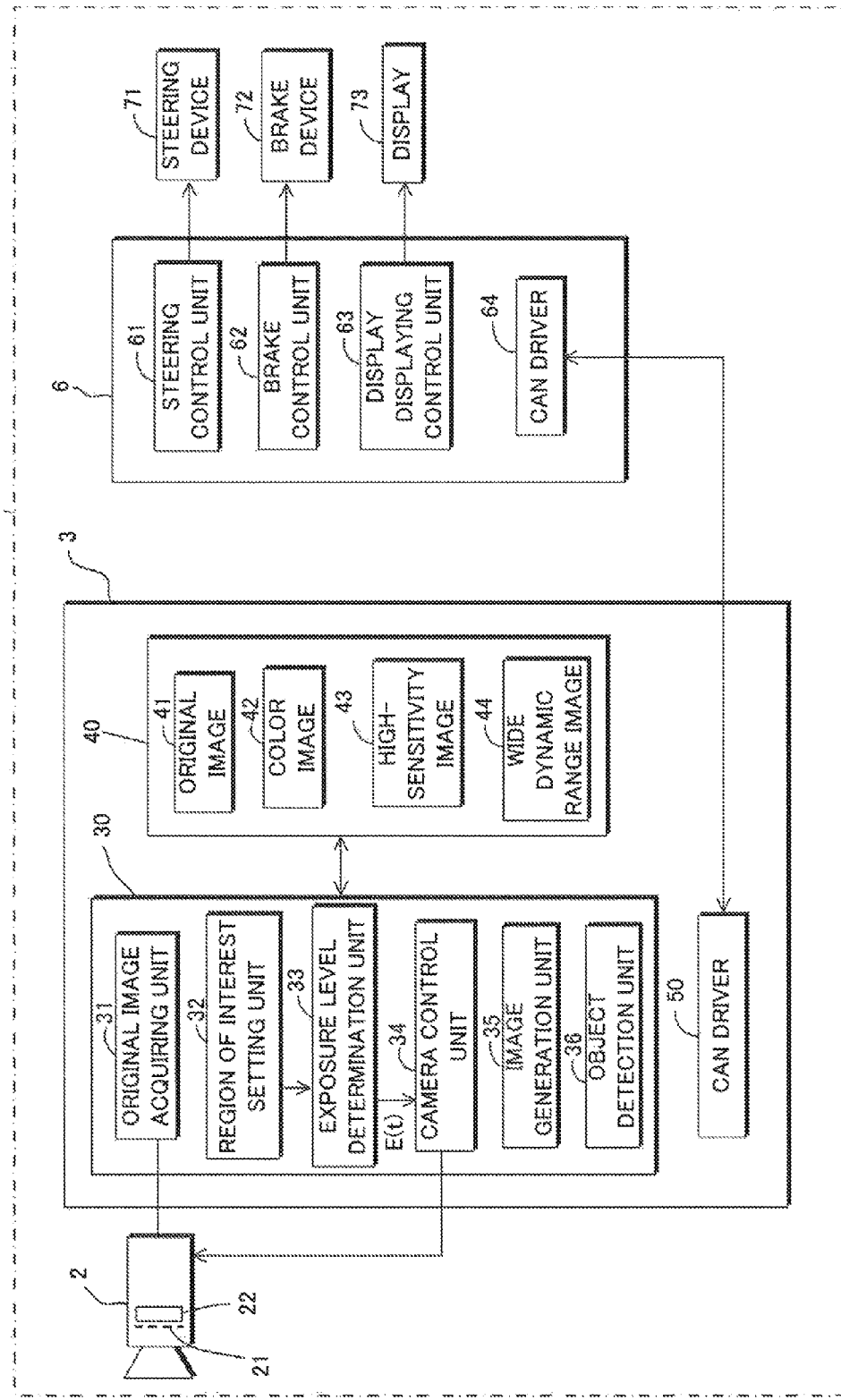
FIG. 1 is a block diagram of an image processing device.

An embodiment of an image processing device of the present invention will be described with reference to FIG. 1 to FIG. 9. With reference to FIG. 1, the image processing device according to this embodiment includes a camera 2 mounted on a vehicle 1 and an image controller 3 connected to the camera 2.

The camera 2 takes an image of a surrounding area of the vehicle 1 by using an imaging element 22 (CCD, CMOS, etc.) in which a filter 21 is incorporated and outputs imaging data to a control circuit 30. The imaging element 22 is configured by arranging a plurality of light-receiving elements of (m×n) in a matrix in a plane.

With reference to FIG. 2A, the filter 21 is attached with any one of the color filters of three primary colors R (red), G (green), and B (blue) individually arranged in the light-receiving path of each of the light-receiving pixels of (m×n) of the imaging element 22. As the color filters, some other type of color filters other than the three primary colors RGB (such as complementary color filters CyMgY) may be used.

Then, the camera 2 outputs data of gradation values as imaging data to the image controller 3. The gradation value depends on a received light level per predetermined time period of a R light-receiving pixel (represented by $R_{11}$, $R_{15}$, . . . in the figure and corresponding to a color light-receiving pixel of the present invention) on which an R filter is mounted, a G light-receiving pixel (represented by $G_{12}$, $G_{14}$, . . . in the figure and corresponding to a color light-receiving pixel of the present invention) on which a G filter is mounted, a B light-receiving pixel (represented by $B_{13}$, $B_{31}$, . . . in the figure and corresponding to a color light-receiving pixel of the present invention) on which a B filter is mounted, and a W light-receiving pixel (represented by $W_{22}$, $W_{24}$, . . . in the figure and corresponding to a transparent light-receiving pixel of the present invention) on which the filter 21 is not mounted.

The image controller 3 has a control circuit 30 including a CPU, a memory, an input-output circuit, and the like, which are not illustrated, an image memory 40, and a CAN (Controller Area Network) driver 50.

The control circuit 30 functions as an original image acquiring unit 31, region of interest (ROI: Region Of Interest) setting unit 32, an exposure level determination unit 33, a camera control unit 34, an image generation unit 35, and an object detection unit 36 by executing an image processing program stored in the memory by using the CPU. Incidentally, a part or all of the original image acquiring unit 31, the region of interest setting unit 32, the exposure level determination unit 33, the camera control unit 34, the image generation unit 35, and the object detection unit 36 may be configured by hardware.

The original image acquiring unit 31 acquires data of an original image 41 from imaging data output from the camera 2, and retains the acquired data in the image memory 40. As shown in FIG. 2B, the original image 41 is formed by individually assigning the gradation value of respective light-receiving pixels (R light-receiving pixels, G light-receiving pixels, B light-receiving pixels, W light-receiving pixels) of the imaging element 22 illustrated in FIG. 2A as a gradation value of pixels in the corresponding arrangement position (a pixel in the same arranged position). In FIG. 2B, the gradation value of each pixel is represented in the form of S (uppercase)+one of lowercase characters r, g, b, w+i,j (i=1,2, . . . , m,j=1, 2, . . . , n).

Here, r represents a gradation value of a pixel (hereinafter referred to as "R pixel". It corresponds to a color pixel of the present invention) in the arrangement position corresponding to the R light-receiving pixel in FIG. 2A, g represents a gradation value of a pixel (hereinafter, referred to as "G pixel". It corresponds to a color pixel of the present invention) in the arrangement position corresponding to the G light-receiving pixel in FIG. 2A, b represents a gradation value of a pixel (hereinafter, referred to as "B pixel". It corresponds to a color pixel of the present invention) in the arrangement position corresponding to the B light-receiving pixel in FIG. 2A, and w represents a gradation value of a pixel (hereinafter, referred to as "W pixel". It corresponds to a transparent pixel of the present invention) in the arrangement position corresponding to the W light-receiving pixel in FIG. 2A.

The image generation unit 35 generates a color image 42 from the original image 41 and retains the data in the image memory 40. Moreover, the image generation unit 35 generates a high-sensitivity image 43 from the original image 41 and the color image 42, and retains the data in the image memory 40. A wide dynamic range image 44 is generated from the color image 42 and the high-sensitivity image 43, and the data is retained in the image memory 40. The details of the generation process of the color image 42, the high-sensitivity image 43, and the wide dynamic range image 44 will be described later.

Figure 4A:
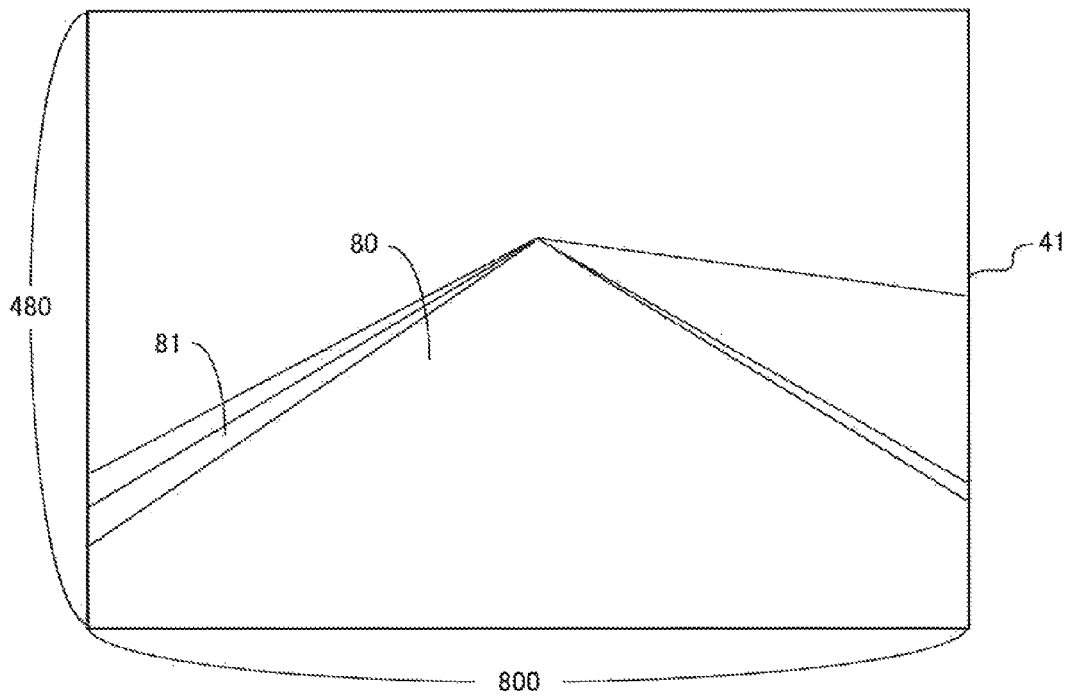
FIG. 4A and FIG. 4B are an explanatory diagram of a region of interest.
Figure 4B:
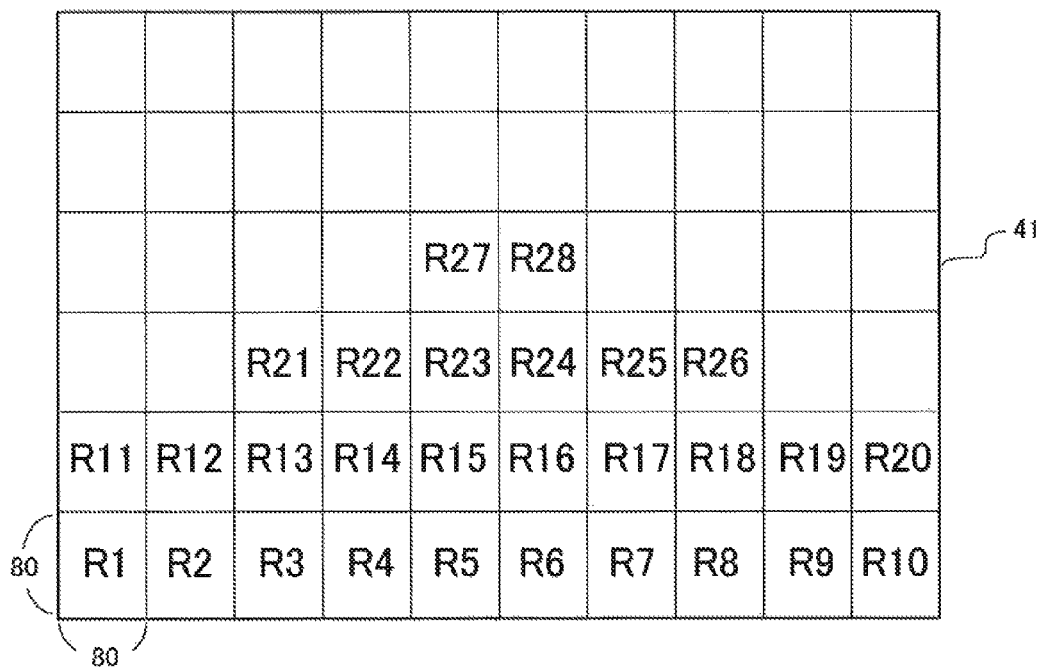

The region of interest setting unit 32 sets 28 region of interests R1 to R28 as illustrated in FIG. 4B in a range including the image portion 80 of the road of the original image 41 as illustrated in FIG. 4A. The original image 41 includes lengthwise (vertical direction) 480 pixels×crosswise (horizontal direction) 800 pixels, and the region of interest includes 80 pixels (vertical×horizontal).

The exposure level determination unit 33 determines the exposure control value (corresponding to the exposure level of the present invention) in the next control cycle based on the gradation values of the region of interest R1 to R28. The camera control unit 34 controls the exposure level of the camera 2 for each predetermined control cycle according to the exposure control value determined by the exposure level determination unit 33, and captures an image.

In the present embodiment, the change of exposure level of the camera 2 is performed by changing the charge storage time by an electronic shutter. However, a mechanical shutter may be also used. Moreover, the exposure level may be changed by changing the diaphragm of the lens equipped to the camera 2.

The object detection unit 36 (including the lane mark detection unit of the present invention) detects a lane mark laid on a road where the vehicle 1 is traveling, other vehicles, a traffic light, a pedestrian, and the like by using the color image 42, the high-sensitivity image 43, and the wide dynamic range image 44 and transmits various control signals to the vehicle controller 6 according to the detection result.

The vehicle controller 6 is an electronic circuit unit which includes a CPU, a memory, an input-output circuit, and the like, which are not illustrated, and functions as a steering control unit 61 which controls the operation of a steering device 71, a brake control unit 62 which controls the operation of a brake device 72, and a display displaying control unit 63 which controls the display of a display 73 by executing a control program of the vehicle 1 retained in the memory by using the CPU. The image controller 3 and the vehicle controller 6 communicate with each other via CAN drivers 50 and 64.

1. Generation Process of Color Image

Next, the generation process of the color image 42 by the image generation unit 35 is explained. The image generation unit 35 generates the color image 42 illustrated in FIG. 3 on the basis of the gradation value of each pixel of the original image 41. In the color image of FIG. 3, the gradation value of each pixel is represented by $C_{i,j}$ (i=1, 2 ..., m, j=1, 2, ..., n).

As described below, $C_{i,j}$ has three elements of a gradation value such as an R value ($C_{i,j}r$: the gradation value of R), a G value ($C_{i,j}g$: the gradation value of G), and a B value ($C_{i,j}b$: the gradation value of B).

$$C_{i,j} = \{C_{i,j}r, C_{i,j}g, C_{i,j}b\}$$

[1-1. Assignment of G Value to $C_{i,j}$]

The image generation unit 35 first calculates a G value ($C_{i,j}g$) to be assigned to each pixel ($C_{i,j}$) of the color image 42. With respect to the G pixel (the pixel having a gradation value $Sg_{i,j}$) of the original image 41, the gradation value of a target pixel is determined to be the G value of a pixel in the corresponding arrangement position (a pixel in the same arranged position) of the color image 42. For example, the image generation unit 35 determines the gradation value ($Sg_{2,3}$) of the pixel of (i,j)=(2, 3) of the original image 41 to be the G value ($C_{2,3}g$) of the pixel of (i,j)=(2, 3) of the color image 42.

In addition, with respect to an R pixel (a pixel having a gradation value $Sr_{i,j}$), a B pixel (a pixel having a gradation value $Sb_{i,j}$), and a W pixel (a pixel having a gradation value $Sw_{i,j}$) of the original image 41, pixels vertically and horizontally adjacent to the R, B, or W pixels are G pixels as illustrated in FIG. 2B. Therefore, the image generation unit 35 calculates G values ($C_{i,j}g$) to be assigned to the pixels in the corresponding arrangement positions of the color image 42, with respect to the gradation values ($Sg_{i-1,j}$, $Sg_{i+1,j}$, $Sg_{i,j-1}$, $Sg_{i,j+1}$) of the G pixels vertically and horizontally adjacent to the target R, B, or W pixels, by using the following equations (1) to (4).

[Math. 1]

$$I1 = |Sg_{i+1,j} - Sg_{i-1,j}| \tag{1}$$

[Math. 2]

$$J1 = |Sg_{i,j+1} - Sg_{i,j-1}| \tag{2}$$

[Math. 3]

$$C_{i,j}g = \frac{Sg_{i+1,j} + Sg_{i-1,j}}{2} \text{(when } I1 < J1) \tag{3}$$

[Math. 4]

$$C_{i,j}g = \frac{Sg_{i,j+1} + Sg_{i,j-1}}{2} \text{(when } I1 > J1) \tag{4}$$

[1-2. Assignment of R value to $C_{i,j}$]

Subsequently, the image generation unit 35 calculates an R value ($C_{i,j}r$) assigned to each pixel ($C_{i,j}$) of the color image 42. With respect to the R pixel (the pixel having a gradation value $Sr_{i,j}$) of the original image 41, the R value ($Sr_{i,j}$) of a target pixel is determined to be the R value ($C_{i,j}r$) of a pixel in the corresponding position of the color image 42. For example, the image generation unit 35 determines the gradation value ($Sr_{3,3}$) of the pixel of (i,j)=(3, 3) of the original image 41 to be the R value ($Cr_{3,3}$) of the pixel of (i,j)=(3, 3) of the color image 42.

Moreover, with respect to a B pixel (a pixel having a gradation value $Sb_{i,j}$) of the original image 41, the second vertically and horizontally adjacent pixels are R pixels as illustrated in FIG. 2B. Therefore, the image generation unit 35 calculates R values ($C_{i,j}r$) to be assigned to the pixels in the corresponding arrangement positions of the color image 42, with respect to the target B pixels, by using the following equations (5) to (8).

[Math. 5]

$$I2 = |Sr_{i+2,j} - Sr_{i-2,j}| \tag{5}$$

[Math. 6]

$$J2 = |Sr_{i,j+2} - Sr_{i,j-2}| \tag{6}$$

[Math. 7]

$$C_{i,j}r = \frac{Sr_{i+2,j} + Sr_{i-2,j}}{2} \text{(when } I2 < J2) \tag{7}$$

[Math. 8]

$$C_{i,j}r = \frac{Sr_{i,j+2} + Sr_{i,j-2}}{2} \text{(when } I2 > J2) \tag{8}$$

Moreover, with respect to a W pixel (a pixel having a gradation value $Sw_{i,j}$) of the original image 41, R pixels are arranged in the diagonally upward right position and the diagonally downward left position or in the diagonally upward left position and the diagonally downward right position as illustrated in FIG. 2B. Therefore, the image generation unit 35 calculates R values ($C_{i,j}r$) to be assigned to the pixels in the corresponding arrangement positions of the color image 42, with respect to the target W pixel of the original image 41, by using the following equations (9) and (10).

[Math. 9]

$$C_{i,j}r = \frac{Sr_{i-1,j+1} + Sr_{i+1,j-1}}{2} \tag{9}$$

$$\left( \begin{array}{c} \text{when } R \text{ pixels are arranged in diagonally upward} \\ \text{right positon and diagonally downward left position} \end{array} \right)$$

-continued

[Math. 10]

$$C_{i,j}r = \frac{Sr_{i-1,j-1} + Sr_{i+1,j+1}}{2} \qquad (10)$$

(when R pixels are arranged in diagonally upward left position and diagonally downward right position)

Moreover, with respect to a G pixel of the original image 41, an R pixel is arranged in one of the pixels vertically and horizontally adjacent to the G pixel as illustrated in FIG. 2B. Therefore, the image generation unit 35 calculates R values ($C_{i,j}r$) to be assigned to the pixels in the corresponding arrangement positions of the color image 42, with respect to the target G pixel of the original image 41, by using the following equations (11) to (14).

[Math. 11]

$$C_{i,j}r = Sr_{i+1,j} \text{ (when R pixel is arranged on lower side)} \qquad (11)$$

[Math. 12]

$$C_{i,j}r = Sr_{i-1,j} \text{ (when R pixel is arranged on upper side)} \qquad (12)$$

[Math. 13]

$$C_{i,j}r = Sr_{i-1,j} \text{ (when R pixel is arranged on right side)} \qquad (13)$$

[Math. 14]

$$C_{i,j}r = Sr_{i,j-1} \text{ (when R pixel is arranged on left side)} \qquad (14)$$

[1-3. Assignment of B Value to $C_{i,j}$]

Subsequently, the image generation unit 35 calculates a B value ($C_{i,j}b$) assigned to each pixel of the color image 42. With respect to the B pixel (the pixel having a gradation value $Sb_{i,j}$) of the original image 41, the gradation value of a target pixel is determined to be the B value of a pixel in the corresponding position of the color image 42. For example, the image generation unit 35 determines the gradation value ($Sb_{3,5}$) of the pixel of (i,j)=(3, 5) of the original image 41 to be the B value ($C_{3,5}b$) of the pixel of (i,j)=(3, 5) of the color image 42.

In addition, with respect to an R pixel of the original image 41, the second vertically and horizontally adjacent pixels are B pixels as illustrated in FIG. 2B. Therefore, the image generation unit 35 calculates B values ($C_{i,j}b$) to be assigned to the pixels in the corresponding arrangement positions of the color image 42, with respect to the target R pixel, by using the following equations (15) to (18).

[Math. 15]

$$I3 = |Sb_{i+2,j} - Sb_{i-2,j}| \qquad (15)$$

[Math. 16]

$$J3 = |Sb_{i,j+2} - Sb_{i,j-2}| \qquad (16)$$

[Math. 17]

$$C_{i,j}b = \frac{Sb_{i+2,j} + Sb_{i-2,j}}{2} \text{ (when } I3 < J3\text{)} \qquad (17)$$

[Math. 18]

$$C_{i,j}b = \frac{Sb_{i,j+2} + Sb_{i,j-2}}{2} \text{ (when } I3 > J3\text{)} \qquad (18)$$

Moreover, with respect to a W pixel (a pixel having a gradation value $Sw_{i,j}$), B pixels are arranged in the diagonally upward right position and the diagonally downward left position or in the diagonally upward left position and the diagonally downward right position as illustrated in FIG. 2B. Therefore, the image generation unit 35 calculates B values ($C_{i,j}b$) to be assigned to the pixels in the corresponding arrangement positions of the color image 42, with respect to the target W pixel, by using the following equations (19) and (20).

[Math. 19]

$$C_{i,j}b = \frac{Sb_{i-1,j+1} + Sb_{i+1,j-1}}{2} \qquad (19)$$

(when B pixels are arranged in diagonally upward right position and diagonally downward left position)

[Math. 20]

$$C_{i,j}b = \frac{Sb_{i-1,j-1} + Sb_{i+1,j+1}}{2} \qquad (20)$$

(when B pixels are arranged in diagonally upward left position and diagonally downward right position)

Moreover, with respect to a G pixel (a pixel having a gradation value $Sg_{i,j}$), a B pixel is arranged in one of the pixels vertically and horizontally adjacent to the G pixel as illustrated in FIG. 2B. Therefore, the image generation unit 35 calculates B values ($C_{i,j}b$) to be assigned to the pixels in the corresponding arrangement positions of the color image 42, with respect to the target G pixel, by using the following equations (21) to (24).

[Math. 21]

$$C_{i,j}b = Sb_{i+1,j} \text{ (when B pixel is arranged on lower side)} \qquad (21)$$

[Math. 22]

$$C_{i,j}b = Sb_{i-1,j} \text{ (when B pixel is arranged on upper side)} \qquad (22)$$

[Math. 23]

$$C_{i,j}b = Sb_{i,j-1} \text{ (when B pixel is arranged on right side)} \qquad (23)$$

[Math. 24]

$$C_{i,j}b = Sb_{i,j-1} \text{ (when B pixel is arranged on left side)} \qquad (24)$$

Through the above process, the image generation unit 35 calculates the R value ($C_{i,j}r$), the G value ($C_{i,j}g$), and the B value ($C_{i,j}b$) assigned to the respective pixels of the color image 42 and generates the color image 42.

[2. Calculation Process of an Exposure Control Value]

Next, the calculation process of the exposure control value by the exposure level determination unit 33 is explained with reference to the flowchart shown in FIG. 5.

The exposure level determination unit 33 calculates the ratio (transparent pixel saturation rate) of the W pixels having a saturated gradation value (W pixels whose gradation value is maximum value) among the W pixels included in each region of interest R1 to R28. Then, the exposure level determination unit 33 performs the processing of STEP 2 to STEP 4 with respect to each region of interest in which the transparent pixel saturation rate is a transparent pixel saturation threshold value Wth or more.

Figure 3:
FIG. 3 is an explanatory diagram of a color image.

In STEP 2, the exposure level determination unit 33 acquires the R value (the R value ($C_{i,j}r$) assigned to each pixel of the color image 42 illustrated in FIG. 3), G value (the G value ($C_{i,j}g$) assigned to each pixel of the color image 42 illustrated in FIG. 3), and B value (the B value ($C_{i,j}b$) assigned to each pixel of the color image 42 illustrated in FIG. 3) of each pixel in the target region of interest.

In next STEP 3, the exposure level determination unit 33 determines whether or not the ratio (color pixel saturation rate) of pixels in which either of the R value, the G value, or the B value is saturated (a pixel in which either the R value, the G value, or the B value has a maximum gradation value) among the total pixels in the region of interest, is equal to or more than a color pixel saturation threshold value Cth.

Then, when the color pixel saturation rate is less than the color pixel saturation threshold value Cth, a reierence gradation value Y (corresponding to a second reference gradation value of the present invention) is calculated from the R value, the G value, and the B value by using the following equation (25).

[Math. 25]

$$Y = 0.3R + 0.59G + 0.11B \tag{25}$$

On the other hand, when the color pixel saturation rate is equal to or more than the color pixel saturation threshold value Cth, the process branches to STEP 4 and does not perform the calculation of the reference gradation value Y since it is difficult to obtain effective luminance information.

When the loop processing of STEP 1 to STEP 5 terminates as described above, the process proceeds to STEP 6, and the exposure level determination unit 33 determines whether or not one or more reference gradation value Y has been calculated. Then, if one or more reference gradation value Y has been calculated, proceeds to STEP 7 and the exposure level determination unit 33 calculates a weighting average value $Y_{ave}$ (corresponding to a first reference gradation value of the present invention) of the reference gradation values Y by the following equation (26).

[Math. 26]

$$Y_{ave} = a_1 \times Y_1 + a_2 \times Y_2 + \ldots + a_p \times Y_p \tag{26}$$

In the above, $Y_{ave}$ is a weighting average value of reference gradation values $Y_1$ to $Y_p$ (the suffix of Y such as 1, 2, ... p represent the number of the calculated reference gradation value), $a_1$ to $a_p$ are weighting coefficients set respect to $Y_1$ to $Y_p$ ($a_1 + a_2 + \ldots + a_p = 1$).

Here, among the regions of interest R1 to R28 shown in FIG. 4B, the value of the weighting coefficients $a_1$ to $a_p$ are set, for example, to large values with respect to R14 to R17 or the like in the center which are more likely to reflect the character of a road, and set to small values with respect to R1, R11 or the like which correspond to end portions o the road.

In the succeeding STEP 8, the exposure level determination unit 33 calculates an exposure control value E(t+1) used in the next control cycle by using the following equation (27).

[Math. 27]

$$E(t+1) = \frac{\beta \cdot S}{\alpha \cdot Y_{ave}} \times E(t) \tag{27}$$

In the above, E(t+1) is an exposure control value to be used in the next control cycle (corresponds to a second exposure level of the present invention), E(t) is an exposure control value (corresponds to a first exposure level of the present invention) used in the present control cycle (corresponds to a control cycle of a predetermined time point of the present invention), β is a set coefficient of the maximum permissible gradation value of W pixel, S is a maximum gradation value of W pixel (255 in the present embodiment), and α is a sensitivity difference coefficient (coefficient for converting $Y_{ave}$ to correspond to the gradation value of the W pixel).

In the above equation (27), the ratio of the desired maximum permissible gradation value (β·S) of the W pixel and the estimated value of the gradation value of the W pixel in the present control cycle ($\alpha \cdot Y_{ave}$ in which the average value $Y_{ave}$ of the reference gradation value is converted to correspond to the gradation value of the W pixel) is multiplied to the exposure control value E(t) used in the current control cycle, thereby changing (correcting) it to calculate the exposure control value E(t+1) to be used in the next control cycle.

On the other hand, in STEP 6, when a region of interest in which the reference gradation value Y is calculated does not exist, the process branches to STEP 20. Then, the exposure level determination unit 33 calculates the exposure control value E(t+) to be used in the next control cycle by using the following equation (28).

[Math. 28]

$$E(t+1) = 0.8 \times E(t) \tag{28}$$

In the above, E(t+1) is an exposure control value to be used in the next control cycle, E(t) is a exposure control value used in the current control cycle.

In the above equation (28), by calculating the exposure control value E(t+1) to be used in the next control cycle by multiplying 0.8 to the exposure control value E(t) used in the current control cycle, the exposure level in the next control cycle is reduced by 20%. Here, the setting of 20% is one example, and may be set to other values according to the imaging situation or the like of the camera 2.

3. Calculation Process of Sensitivity Difference Coefficient α

Next, the calculation process of sensitivity difference coefficient α by the exposure level determination unit 33 is explained in accordance with the flow chart shown in FIG. 6. The sensitivity difference coefficient α corresponds to a luminance difference degree of the present invention.

The exposure level determination unit 33 calculates the sensitivity difference coefficient α Lb regarding a plurality of traffic lane blocks set in the image portion of the white lane of the original image 41 (81 of FIG. 4A) by the process of STEP 30 to STEP 37 shown in FIG. 6, and also calculates the sensitivity difference coefficient αRb regarding a plurality of road blocks set in the image portion of the road in the original image 41.

[3-1. Calculation of Sensitivity Difference Coefficient of Traffic Lane Block]

The exposure level determination unit 33 extracts a plurality of traffic lane blocks from the image portion of the white lane in the original image 41 in STEP 30. Here, the size of the traffic lane block may be the same as the size of the region of interest, or may be different.

Similar to the above described STEP 1 and STEP 3 of FIG. 5, the exposure level determination unit 33 calculates the transparent pixel saturation rate and the color pixel saturation rate for each of the extracted traffic lane block. Then, processing by the loop of STEP 31 to STEP 34 is performed with respect to the unsaturated traffic lane blocks (Lb1, Lb2, ..., Lbh, corresponding to an unsaturated region and a second unsaturated region of the present invention), in which the transparent pixel saturation rate is less than the transparent pixel saturation threshold value Wth and the color pixel saturation rate is less than the color pixel saturation threshold value Cth.

By the loop of STEP 31 to STEP 34, the exposure level determination unit 33 calculates the average value Lbw of the gradation values of the W pixels in the traffic lane block in STEP 32, and calculates the average value Lby of the reference gradation values Y of R, (i and B pixels in the traffic lane block in STEP 33.

In the next STEP 35, the exposure level determination unit 33 calculates by using the following equation (29), the average value $Lbw_{ave}$ with respect to the average value Lbw of the gradation value of the W pixels in each traffic lane block calculated in STEP 32.

[Math. 29]

$$Lbw_{ave} = \frac{Lbw1 + Lbw2 + \ldots + Lbwh}{h} \quad (29)$$

In the above, Lbw1, Lbw2, ..., Lbwh are average values of the gradation values of the W pixels in each traffic lane block (h represents a number of traffic lane blocks in which the average value of the gradation value of W pixels is calculated).

In STEP 36, the exposure level determination unit 33 calculates the average value $Lby_{ave}$ with respect to the average value Lby of the reference gradation value Y of R, G, and B pixels in each traffic lane block calculated in STEP 33 by using the following equation (30).

[Math. 30]

$$Lby_{ave} = \frac{Lby1 + Lby2 + \ldots + Lbyh}{h} \quad (30)$$

In the above, Lby1, Lby2, ..., Lbyh are average values of the reference gradation value Y of R, G and B pixels in each traffic lane block (h represents a number of traffic lane blocks in which the average value of the reference gradation value Y of R, (i and B pixels is calculated).

In next STEP 37, the exposure level determination unit 33 calculates the sensitivity difference coefficient αLb (corresponding to a second luminance difference degree of the present invention) with respect to the traffic lane block by using the following equation (31).

[Math. 31]

$$\alpha LB = \frac{Lbw_{ave}}{Lby_{ave}} \quad (31)$$

In the above, α Lb is a sensitivity difference coefficient with respect to the traffic lane block, $Lbw_{ave}$ is an average value of gradation values of W pixels of the traffic lane block, $Lby_{ave}$ is an average value of the reference gradation values Y of R, G, and B pixels of the traffic lane block.

[3-2. Calculation of Sensitivity Difference Coefficient of a Road Block]

The exposure level determination unit 33 extracts a plurality of road blocks from the image portion of the road (80 of FIG. 4A) in the original image 41 in STEP 40. Here, the size of the road block may be the same as the size of the region of interest, or may be different.

Similar to the above described STEP 1 and STEP 3 of FIG. 5, the exposure level determination unit 33 calculates the transparent pixel saturation rate and the color pixel saturation rate for the extracted each road block. Then, processing by the loop of STEP 41 to STEP 44 is performed with respect to the unsaturated road blocks (Rb1, Rb2, ..., Rbk, corresponding to an unsaturated region and a first unsaturated region of the present invention), in which the transparent pixel saturation rate is less than the transparent pixel saturation threshold value Wth and the color pixel saturation rate is less than the color pixel saturation threshold value Cth.

By the loop of STEP 41 to STEP 44, the exposure level determination unit 33 calculates the average value Rbw of the gradation value of the W pixels in the road block in STEP 42, and calculates the average value Rby of the reference gradation values Y of R, G, and B pixels in the road block in STEP 43.

In the next STEP 45, the exposure level determination unit 33 calculates by using the following equation (32), the average value $Rbw_{ave}$ with respect to the average value Rbw of the gradation values of the W pixels in each road block calculated in STEP 42.

[Math. 32]

$$Rbw_{ave} = \frac{Rbw1 + Rbw2 + \ldots + Rbwk}{k} \quad (32)$$

In the above, Rbw1, Rbw2, ..., Rbwk are average values of the gradation value of the W pixels in each road block (k represents a number of road blocks in which the average value of the gradation value of W pixels is calculated).

In STEP 46, the exposure level determination unit 33 calculates by using the following equation (33), the average value $Rby_{ave}$ with respect to the average value Rby of the reference gradation value Y of R, G, and B pixels in each road block calculated in STEP 43.

[Math. 33]

$$Rby_{ave} = \frac{Rby1 + Rby2 + \ldots + Rbyk}{k} \quad (33)$$

In the above, Rby1, Rby2, ..., Rbyk are average values of the reference gradation value Y of R, G and B pixels in each road block (k represents a number of road blocks in which the average value of the reference gradation value Y of R, G, and B pixels is calculated).

In next STEP 47, the exposure level determination unit 33 calculates the sensitivity difference coefficient αRb (corresponding to a first luminance difference degree of the present invention) with respect to the road block by using the following equation (34).

[Math. 34]

$$\alpha Rb = \frac{Rbw_{ave}}{Rby_{ave}} \quad (34)$$

In the above, αRb is a sensitivity difference coefficient with respect to the road block, $Rbw_{ave}$ is an average value of the gradation values of W pixels of the road block, $Rby_{ave}$ is an average value of the reference gradation values Y of R, G, and B pixels of the road block.

[3-3. Calculation of a Sensitivity Difference Coefficient]

In the succeeding STEP 38, by using the following equation (35), the exposure level determination unit 33 calculates the sensitivity difference coefficient α used in the aforementioned equation (27) by obtaining the weighted-average of the sensitivity difference coefficient αLb for the traffic lane block calculated in STEP 37 and the sensitivity difference coefficient αRb for the road block calculated in STEP 47.

[Math. 35]

$$\alpha = b1 \times \alpha Lb + b2 \times \alpha Rb \quad (35)$$

In the above, α is a sensitivity difference coefficient, αLb is a sensitivity difference coefficient for the traffic lane block, αRb is a sensitivity difference coefficient for the road block, and b1, b2 are weighting coefficients (b1+b2=1).

Here, FIG. 7 aims to explain the meaning of calculating the exposure control value E(t+1) to be used in the next control cycle by the aforementioned equation (27). The left side of FIG. 7 illustrates a situation of the current control cycle in which E(t) is used as the exposure control value, and the right side illustrates a situation of the next control cycle in which exposure control value E(t+1) calculated by the aforementioned equation (27) is used.

In the current control cycle, the gradation value of the W pixel is saturated and since it is not possible to obtain the actual gradation value of the W pixel, an assumed value W1 of the gradation value of the W pixel is calculated as a corrected gradation value by multiplying sensitivity difference coefficient α to the reference gradation value $Y_{ave}1$ which is calculated from the gradation values of unsaturated R, G, and B pixels. Moreover, the maximum permissible value W2 of the luminance in the next control cycle is calculated by S(255)×β.

In this case, the exposure control value E(t+1) to be used in the next control cycle may be a value which reduces the assumed value W1 of the gradation value of the W pixel in the current control cycle to W2. In this regard, according to the aforementioned equation (27), by calculating the exposure control value E(t+1) to be used in the next control cycle by multiplying W2/W1 (=β·S/α·$Y_{ave}$) to the exposure control value E(t) used in the current control cycle, it is able to appropriately reduce the exposure level of camera 2 in the next control cycle to a level which reduces W1 to W2.

Next, the generation process of high-sensitivity image 43 and wide dynamic range image 44 by the image generation unit 35 is explained.

[4. Generation Process of High-Sensitivity Image]

The image generation unit 35 calculates a gradation value ($H_{i,j}$) to be assigned to each pixel of the high-sensitivity image 43 by using the gradation value ($Sw_{i,j}$) of the W pixel of the original image 41 and R, G, and B values of each pixel of the color image 42.

The image generation unit 35 first calculates a gray reference gradation value $Y_{i,j}$ with respect to each pixel of the color image 42, by using the following equation (36).

[Math. 36]

$$Y_{i,j} = 0.3 \times C_{i,j}r + 0.59 \times C_{i,j}g + 0.11 \times C_{i,j}b \quad (36)$$

In the above, $Y_{i,j}$ is a reference gradation value, $C_{i,j}r$ is an R value of each pixel $C_{i,j}$ of the color image 42, $C_{i,j}g$ is a G value of each pixel $C_{i,j}g$ of the color image 42, $C_{i,j}b$ is a B value of each pixel $C_{i,j}$ of the color image 42, and 0.3, 0.59, and 0.11 are weighting coefficients determined by an experiment or the like, though any other value may be used.

Thereafter, the image generation unit 35 calculates a ratio $a_{i,j}$ between the gradation value $Sw_{i,j}$ of each W pixel of the original image 41 and the reference gradation value $Y_{i,j}$ of the pixel of the color image 42 in the arrangement position corresponding to each W pixel, as a sensitivity difference correction coefficient by using the following equation (37).

[Math. 37]

$$a_{i,j} = \frac{Sw_{i,j}}{Y_{i,j}} \quad (37)$$

[4-1. Assignment of Gradation Value $H_{i,j}$ Corresponding to W Pixel]

The image generation unit 35 assigns the gradation value ($Sw_{i,j}$) of the W pixel of the original image 41 to the gradation value ($H_{i,j}$) of a pixel in the corresponding arrangement position of the high-sensitivity image 43.

[4-2. Assignment of Gradation Value $H_{i,j}$ Corresponding to G Pixel]

In the original image 41 illustrated in FIG. 2B, W pixels are arranged in the positions horizontally or vertically adjacent to a G pixel. Therefore, the image generation unit 35 calculates a gradation value ($H_{i,j}$) assigned to the pixel of the high-sensitivity image 43 in the arrangement position corresponding to the G pixel of the original image 41 by using equations (38) and (39) described below.

[Math. 38]

$$H_{i,j} = \frac{a_{i+1,j} + a_{i-1,j}}{2} \times Y_{i,j} \quad (38)$$

(when the W pixels are arranged in vertical positions)

[Math. 39]

$$H_{i,j} = \frac{a_{i,j+1} + a_{i,j-1}}{2} \times Y_{i,j} \quad (39)$$

(when the W pixels are arranged in horizontal positions)

[4-3. Assignment of Gradation Value $H_{i,j}$ Corresponding to R and B Pixels]

In the original image 41 illustrated in FIG. 2B, W pixels are arranged diagonally upward and downward of the R pixel and the B pixel. Therefore, the image generation unit 35 calculates gradation values ($H_{i,j}$) assigned to the pixels of the high-sensitivity image 43 in the positions corresponding to the R and B pixels of the original image 41 by using the following equation (40).

[Math. 40]

$$H_{i,j} = \frac{a_{i+1,j+1} + a_{i+1,j-1} + a_{i-1,j+1} + a_{i-1,j-1}}{4} \times Y_{i,j} \quad (40)$$

Through the above process, the image generation unit 35 is able to generate a high-sensitivity image 43 in which gradation values (Hij) are assigned to the pixels corresponding to the respective pixels of the original image 41, as illustrated in FIG. 8A.

[5. Generation Process of Wide Dynamic Range Image]

The image generation unit 35 calculates a gradation value ($D_{i,j}$) assigned to each pixel of a wide dynamic range image 44 by performing addition using a weighting function of the following equation (41) between the pixels of the color image 42 and the pixels of the high-sensitivity image 43 in the corresponding arrangement positions (the pixels in the same arranged positions).

[Math. 41]

$$w(x) = \frac{1}{1+e^{g(0.5-x)}} \quad (41)$$

In the above, w(x) is a sigmoid function and g is a gain. Incidentally, the above equation (41) is one example of the weighting function and other weighting functions may be used.

The image generation unit 35 calculates a normalized composite gradation value ($hdr_{i,j}$) by using an equation (42) described below on the basis of a normalized gradation value ($h_{i,j}$) obtained by normalizing the gradation value ($H_{i,j}$) of the high-sensitivity image 43 with respect to the maximum gradation value (255 for 8-bit resolution or 1023 for 10-bit resolution) and a normalized gradation value ($y_{i,j}$) obtained by normalizing a reference gradation value ($Y_{i,j}$) calculated by the aforementioned equation (35) from the color image 42, with respect to the maximum gradation value.

[Math. 42]

$$hdr_{i,j} = \frac{(1-w(h_{i,j})) \times h_{i,j} + w(h_{i,j}) \times a' \times y_{i,j}}{a'} \quad (42)$$

In the above, $h_{i,j}$ and $y_{i,j}$ are normalized gradation values and a' is a sensitivity difference correction coefficient $a_{i,j}$ of the pixel calculated by the aforementioned equation (37) if the target is a pixel corresponding to a W pixel, or a sensitivity difference correction coefficient $a_{i,j}$ of the pixel corresponding to the W pixel arranged in the periphery if the target is a pixel corresponding to R, C or B.

Furthermore, in order to maintain the low gradation contrast, γ conversion processing is performed for the normalized composite gradation value ($hdr_{i,j}$) by using an equation (43) described below.

[Math. 43]

$$D_{i,j} = Mb \times (hdr_{i,j})^{\frac{1}{\gamma}} \quad (43)$$

In the above, $D_{i,j}$ is a gradation value of a wide dynamic range image and Mb is the maximum gradation value.

Through the above process, the image generation unit 35 is able to generate a wide dynamic range image 44 in which a gradation value ($D_{i,j}$) is assigned to the pixel corresponding to each pixel of the original image 41 as illustrated in FIG. 8B.

[6. Object Detection Processing]

Next, the process by the object detection unit 36 is explained. The object detection unit 36 switches among a process of detecting an object from the color image 42, a process of detecting an object from the high-sensitivity image 43, and a process of detecting an object from the wide dynamic range image 44 according to the type of the detected object or the imaging conditions of the camera 2.

[6-1. Object Detection by High-Sensitivity Image]

The object detection unit 36 detects a pedestrian from the high-sensitivity image 43. The pedestrian is often of low luminance. Therefore, a pedestrian existing around the vehicle 1 is able to be detected with precision by using the high-sensitivity image 43.

The object detection unit 36 determines whether a pedestrian is likely to come in contact with the vehicle 1 at the time of detecting the pedestrian. If determining that the pedestrian is likely to come in contact with the vehicle 1, the object detection unit 36 transmits a control signal for instructing to execute a contact avoidance action to the vehicle controller 6.

In response to receiving the control signal, the display displaying control unit 63 of the vehicle controller 6 displays an alarm on the display 73. Moreover, the brake control unit 62 activates the brake device 72 to perform a contact avoidance process, if necessary.

[6-2. Object Detection Using Wide Dynamic Range Image]

The object detection unit 36 determines whether it is night or not. Whether it is night or not is determined from, for example, a state of whether headlights (not illustrated) mounted on the vehicle 1 are on or off. Alternatively, the vehicle 1 may be provided with an illumination sensor to determine whether it is night or not from illuminance detected by the illuminance sensor.

If it is night, the object detection unit 36 detects other vehicles and pedestrians from the wide dynamic range image 44. Note here that it is necessary to detect objects of a wide range of luminance levels from dark to light objects during nighttime.

The dark objects include any other remote vehicle outside the region illuminated by the headlights of the vehicle 1, an interrupt vehicle, a suddenly appearing vehicle, a pedestrian on a sidewalk outside the region illuminated by the headlights of the vehicle 1, a pedestrian crossing the road, and the like. Moreover, the light objects include the tail lights and stop lights of a preceding vehicle, the headlights of an oncoming vehicle, a pedestrian illuminated by the headlights of the vehicle 1, and the like.

Therefore, during nighttime, other vehicles and pedestrians can be detected by using the wide dynamic range image 44.

When detecting a pedestrian or another vehicle having a possibility to come in contact with the vehicle, the object detection unit 36 transmits a control signal for giving an instruction to perform a contact avoidance action to the vehicle controller 6 as described above.

[6-3. Object Detection Using the Color Image]

When it is not night, the object detection unit 36 detects a lane mark laid on a road, other vehicles, and a traffic light from the color image 42. Note here that, if the sky illuminance of daytime is sufficiently high, high sensitivity is unnecessary to detect a lane mark, other vehicles, and traffic light, but color information needs to be acquired with high contrast.

Therefore, the object detection unit 36 detects the lane mark, other vehicles, and traffic light from the color image 42. In such case, the object detection unit 36 determines the attributes of the lane mark from the color of the lane mark (white line, yellow line, etc.). Moreover, the object detection unit 36 determines whether or not there is a possibility to rear-end by detecting a red color of tail light of the preceding vehicle.

Then, the object detection unit 36 recognizes an image portion of the road based on the detected position of the lane mark, and transmits a control signal for lane keeping control for keeping the vehicle 1 within a traffic lane to the vehicle controller 6. In response to receiving this control signal, the steering control unit 61 controls the operation of the steering device 71.

Moreover, when the object detection unit 36 detects another vehicle having a possibility to contact with the vehicle, transmits a signal for giving an instruction to perform a contact avoidance action to the vehicle controller 6 as described above. Furthermore, when the object detection unit 36 detects red light of a traffic light ahead, transmits an alarm signal to the vehicle controller 6 in a case where the driver did not perform a braking operation. In response to receiving the alarm signal, the display displaying control unit 63 displays an alarm on the display. In addition, the brake control unit 62 activates the brake device 72 to brakes the vehicle 1, if needed.

In the present embodiment, the camera 2 using the imaging element 22 attached with a filter 21 having an arrangement pattern of R, G, B, and W as illustrated in FIG. 2A, was explained. However, a filter 21-1 having other arrangement pattern of R, G, B, and W as illustrated in FIG. 9A may be used. A captured image (original image) in the case of using the filter 21-1 of FIG. 9A is shown as 41-1 illustrated in FIG. 9B.

Moreover, in the present embodiment, an example of mounting the image processing device of the present invention to the vehicle 1 was explained. However, it is not especially restricted to this embodiment, and the present invention can be applied to various intended use such as monitoring device or the like.

In the present invention, by the process of FIG. 6, the sensitivity correction coefficient ($\alpha$) is calculated based on the gradation value and the reference gradation value Y of the W pixels in the traffic lane block and the road block. However, the sensitivity correction coefficient ($\alpha$) may be a previously set fixed value. Moreover, the sensitivity correction coefficient ($\alpha$) may be calculated based on the gradation value and the reference gradation value Y of the W pixels in either one of the traffic lane block and the road block.

Moreover, in the present embodiment, according to the process of STEP 1 to STEP 5 in FIG. 5, the exposure control value E(t+1) to be used in the next control cycle is determined by the above described equation (27) by calculating the reference gradation value Y in the region of interest in which the color pixel saturation rate is less than the color pixel saturation threshold value Cth and the average value $Y_{ave}$ thereof, with respect to the region of interest in which the transparent pixel saturation rate is equal to or more than the transparent pixel saturation threshold value Wth. However, the E(t+1) may be obtained by changing E(t) based on only the transparent pixel saturation rate.

Moreover, the exposure control value E(t+1) to be used in the next control cycle may be determined by changing the exposure control value E(t) used in the current control cycle based on the transparent pixel saturation rate, and the average value $Y_{ave}$ of the reference gradation values Y by using an equation other than the above described equation (27) or by a map or the like.

Moreover, in the present embodiment, the exposure control value E(t+1) to be used in the next control cycle is calculated by setting a plurality of region of interests and by using the gradation value of the W pixel and the average value of the reference gradation values of R, CG and B pixels of each region of interest. However, only one region of interest may be set to calculate the exposure control value E(t+1).

INDUSTRIAL APPLICABILITY

As described above, according to the image processing device of the present invention, an exposure level of a camera using imaging elements including an arrangement of pixels receiving light through a color filter and pixels receiving light without using a color filter, can be appropriately set while restraining complexity of circuit configuration and deterioration of image quality of the captured image. Therefore, it is useful to improve the sensitivity of a color image.

DESCRIPTION OF THE REFERENCE NUMERALS

1 . . . Vehicle, 2 . . . Camera, 3 . . . Image controller, 6 . . . Vehicle controller, 21 . . . Filter, 22 . . . Imaging element, 30 . . . Control circuit, 31 . . . Original image acquiring unit, 32 . . . Region of interest setting unit, 33 . . . Exposure level determination unit, 34 . . . Camera control unit, 35 . . . Image generation unit, 36 . . . Object detection unit, 41 . . . Original image, 42 . . . Color image, 43 . . . High-sensitivity image, 44 . . . Wide dynamic range image.

The invention claimed is:

1. An image processing device comprising:
a camera configured to capture an image using an imaging element including an arrangement of a plurality of color light-receiving pixels which receive light through a color filter and a plurality of transparent light-receiving pixels which receive light without using the color filter;
a camera control unit configured to capture an image by the camera at a predetermined exposure level for each predetermined control cycle;
a region of interest setting unit configured to set at least one predetermined region of interest with respect to an original image captured by the camera and including an arrangement of a plurality of color pixels with each color pixel being assigned with a gradation value according to a light-receiving level of each of the color light-receiving pixels and a plurality of transparent pixels with each transparent pixel being assigned with a gradation value according to a light-receiving level of each of the transparent light-receiving pixels; and
an exposure level determination unit configured, for the region of interest of the original image captured by the camera using a first exposure level in a control cycle of a predetermined time point, to calculate a transparent pixel saturation rate which is a ratio of transparent pixels whose gradation value is saturated among the transparent pixels in the region of interest, and to determine a second exposure level which is an exposure level of a next control cycle by changing the first exposure level according to the transparent pixel saturation rate.

2. The image processing device according to claim 1, wherein the exposure level determination unit is configured, with respect to the region of interest, to calculate a color pixel saturation rate which is a ratio of color pixels whose gradation value is saturated among the color pixels, and when the color pixel saturation rate is less than a predetermined color pixel saturation threshold value, to calculate a gray first reference gradation value based on the gradation value of each of the color pixels in the region of interest, and to determine the second exposure level based on the first reference gradation value.

3. The image processing device according to claim 2, wherein the color filter is a three primary color filter, and the color light-receiving pixels receive light through a filter of either color among three primary colors, and the exposure level determination unit is configured,
for each transparent pixel in the region of interest, to assign each gradation value of the three primary color based on the gradation value of the color pixels arranged in periphery, and also for each of the color pixels in the region of interest, to assign each gradation value of the three primary color based on the gradation value of each of the color pixels or the gradation value of other color pixels arranged in periphery, to calculate a gray second reference gradation value of each pixel from the each gradation value of the three primary color assigned to the each pixel of the original image, and to calculate the first reference gradation value by averaging the second reference gradation value of the each pixel.

4. The image processing device according to claim 3, wherein the exposure level determination unit is configured, to extract an unsaturated region from the region of interest, the unsaturated region being a region in which the transparent pixel saturation rate is less than a first transparent pixel saturation threshold value and also the color pixel saturation rate is less than a second color pixel saturation threshold value, and to calculate a luminance difference degree between an average value of the gradation value of the transparent pixels in the unsaturated region and an average value of the second reference gradation value of the color pixels in the unsaturated region, and to determine the second exposure level by using a corrected gradation value in which the first reference gradation value is corrected based on the luminance difference degree.

5. The image processing device according to claim 4, wherein the exposure level determination unit is configured, to determine the second exposure level based on a difference between a maximum permissible gradation value of each transparent pixel and the corrected gradation value, so as to reduce the difference.

6. The image processing device according to claim 4, wherein the camera is mounted on the vehicle and images a periphery of the vehicle, and the exposure level determination unit is configured to extract the unsaturated region from an image portion of a road included in the original image.

7. The image processing device according to claim 6, comprising, a lane mark detection unit configured to detect an image portion of a lane mark laid on the road from the original image, and wherein the exposure level determination unit is configured to recognize the image portion of the road included in the original image based on a position of the image portion of the lane mark detected by the lane mark detection unit.

8. The image processing device according to claim 7, wherein the lane mark detection unit is configured to detect an image portion of a white line as the image portion of the lane mark, and the exposure level determination unit is configured, to extract a first of the unsaturated region from the image portion of the road in the region of interest and also extract a second of the unsaturated region from the image portion of the white line in the region of interest, and to calculate the luminance difference degree used for a calculation of the corrected gradation value by weighting and averaging a first of the luminance difference degree calculated for the first of the unsaturated region and a second of the luminance difference degree calculated for the second of the unsaturated region.

* * * * *